May 16, 1933.    A. BERENBRUCH    1,909,145
RECOVERY OF ENERGY TRANSMITTED TO LIQUIDS
Filed April 28, 1930    2 Sheets-Sheet 1

INVENTOR
Albert Berenbruch
BY Hauff &barland
ATTORNEYS

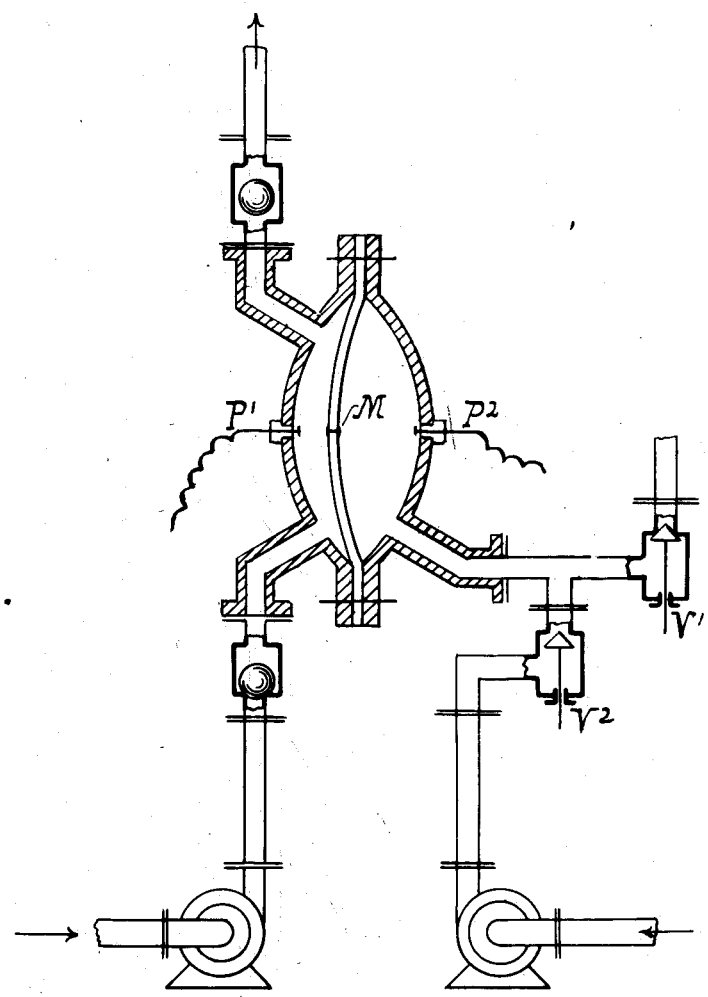

Patented May 16, 1933

1,909,145

UNITED STATES PATENT OFFICE

ALBERT BERENBRUCH, OF NEUROESSEN, GERMANY, ASSIGNOR TO I. G. FARBENINDUSTRIE AKTIENGESELLSCHAFT, OF FRANKFORT-ON-THE-MAIN, GERMANY

RECOVERY OF ENERGY TRANSMITTED TO LIQUIDS

Application filed April 28, 1930, Serial No. 448,151, and in Germany May 8, 1929.

The present invention relates to improvements in and apparatus for the recovery of the energy transmitted to liquids in the conveyance of the same against high pressure. In the chemical industry it frequently happens that gases must be trickled under pressure with water or other washing liquids in trickling towers for the purpose of purification, the pressure in some cases, for example in the synthesis of ammonia, amounting to several hundred atmospheres. For this purpose the liquid must be brought to the necessary pressure and conveyed by means of pumps. The liquid, after use, is in most cases released from pressure again, for example by valves or other suitable throttle means, without the recovery of the energy expended in the pumps which may amount to several thousand horsepower.

Apparatus for the recovery of this energy have already been proposed and constructed. These consist of a water motor driven by the liquid under pressure, for example a Pelten wheel and a pump coupled with the same which brings fresh liquid to the necessary pressure. Such arrangements may be used for comparatively small pressures up to about from 25 to 50 atmospheres but fail to work with pressures of 100 or several hundred atmospheres. Moreover the efficiency of such arrangements is very bad and even in the most favorable cases only amounts to 50 per cent.

I have now found that the energy transmitted to a liquid in the conveyance of the same against high pressure may be recovered in a simple and economical manner by transmitting the pressure of this liquid immediately to a second liquid to be conveyed against the high pressure. The energy may be transmitted from the liquid issuing from the high pressure plant to the liquid to be fed thereto by means of one or more pistons the piston surface of which is smaller on the pump side, that is to say that side at which the second liquid is compressed, than on the opposite side, preferably by the amount of the cross section of the piston rod, or by the interposition of a membrane.

The nature of the invention will be further described with reference to the accompanying drawings which show diagrammatically arrangements of apparatus according to this invention, but the invention is not restricted to these arrangements.

Figure 4 is a diagrammatic sectional view of another arrangement for carrying out my invention in practice by means of a membrane.

Figure 1:
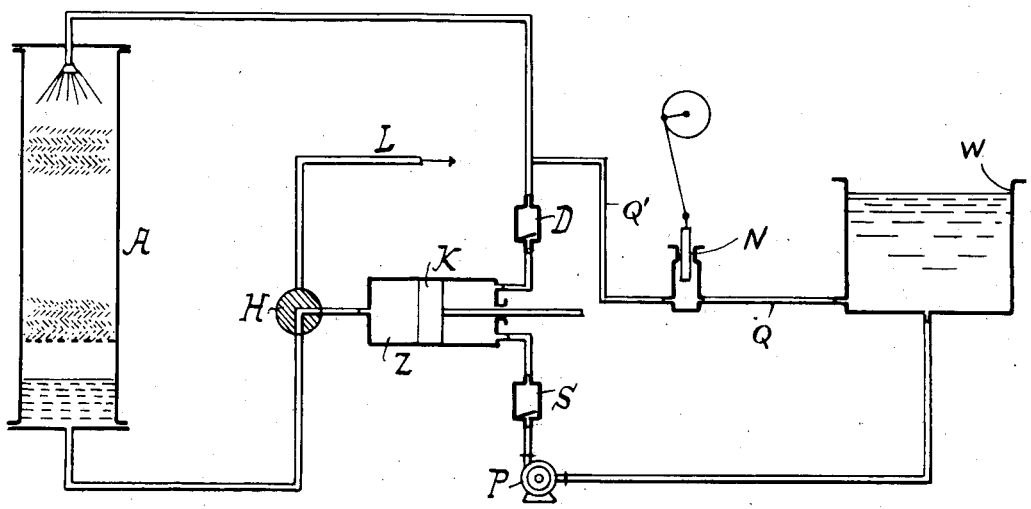
Figure 1 represents in vertical cross-section a high pressure plant to which a liquid is supplied and from which it is removed in combination with an apparatus embodying my invention.

Referring to Figure 1, Z is a cylinder closed on both sides in which is a pressure tight piston K. One side of this cylinder serves as a hydraulic motor and the other as a pump like an ordinary piston pump with a suction valve S and a delivery valve D. The mode of action is as follows: The reaction vessel A which is under high pressure is connected to the cylinder Z on one side of the piston by means of a regulating device H shown in the Figure as a three-way valve. On the other side of the piston, fresh liquid, brought to a small pressure for example by reason of the height of the liquid container W or by means of a pump P may be allowed to flow from the container W through the suction valve S into the cylinder Z. The regulating device H is reversed in the manner already known by the piston rod in the dead point positioned in such a manner that the cylinder is in connection at one time with the pressure vessel A and at another time with the atmosphere or with a collecting vessel by means of a pipe L. With the three-way valve in the position shown, liquid flows from A into the cylinder Z, pushes the piston forward and at the same time forces the fresh liquid on the other side of the piston through the delivery valve D into the pressure vessel A through the pipe connection U. This movement is rendered possible by the fact that the piston surface, and therefore the piston pressure, on the pump side is smaller than the other side by the amount of the cross section of the piston rod. At the end of the stroke the regulating device H is reversed by the piston rod and the piston moves back towards the other side under the pressure of the fresh liquid and the used liquid on this side may flow away with the pressure released. This action is repeated continuously in the same manner.

Such a machine would only produce a discontinuous stream of liquid. In order to produce a continuous stream it is necessary to employ two or more cylinders the regulating devices of which are coupled so that an oppositely directed movement of the pistons is always obtained.

The piston or pistons thus serve only as a separating wall between the liquid to be released from pressure and the liquid to be conveyed, they transmit no power to the outside but by their motion simply cause the regulation of the feed valve and delivery valve.

Figure 2:
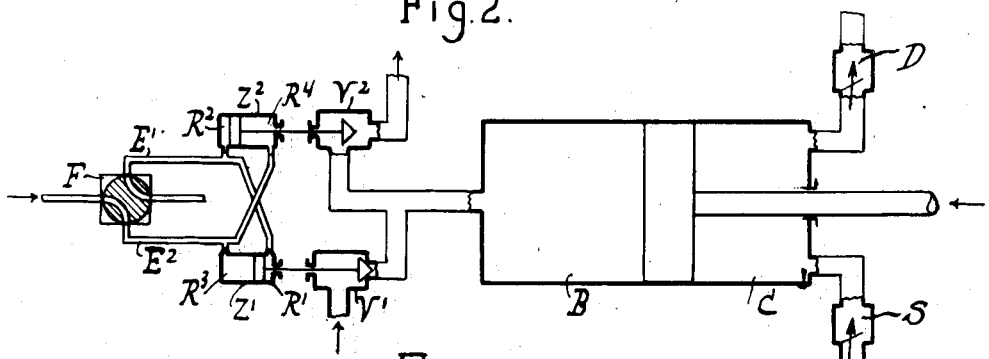
Figures 2 and 3 show in cross-section different arrangements for working the valves admitting and shutting off the supply of the liquid under pressure.

Slide valves or stopcocks are not suitable as regulating devices for high pressure. It is preferable to employ valves for this purpose, one for the inlet and one for the outlet for the liquid. The movement of these valves, which may be produced by mechanical or hydraulic means, must be such that the open valve must be closed before the closed valve begins to open, that is so that the two valves are never open at the same time, because otherwise the pressure liquid in the vessel A would become directly released from pressure while passing through the cylinder Z, and as a direct consequence the highly compressed gas in the system would also be released from pressure and this in some cases is attended with great danger. A suitable arrangement of the regulating device is shown in Figure 2, $V_1$ and $V_2$ being hydraulically operated valves $Z_1$ and $Z_2$ the respective hydraulic cylinders and F the mutual regulating cock for the pressure medium which operates the valves, and for this purpose a part of the pressure liquid the pressure of which is to be utilized, may itself be used. This regulating cock F is operated by means of a transferrer mechanism by the piston rod in the dead point positions. At the time shown in the drawings the piston moves from right to left, that is the liquid present in the chamber B of the working cylinder is released from pressure and may flow through the valve $V_2$ into the free air or a suitable container while the chamber C fills with fresh liquid. As soon as, in the left dead point position, the regulating cock F is reversed, the pressure medium, thereby also reversed, flows through the pipe $E_1$ simultaneously into the cylinder chambers $R_1$ and $R_2$ while the chambers $R_3$ and $R_4$ are released from pressure through the pipe $E_2$. In view of the fact that the valve head $V_2$ is completely relieved of pressure and encounters no opposition in its motion while on the contrary the valve head $V_1$ is loaded on one side by the pressure of the washing liquid and in consequence requires a considerable pressure to open it, it follows that the valve $V_2$ must be completely closed before the pressure of the pressure medium attains a value sufficient to open the valve $V_1$. The same is true for the inverse case.

Figure 3:
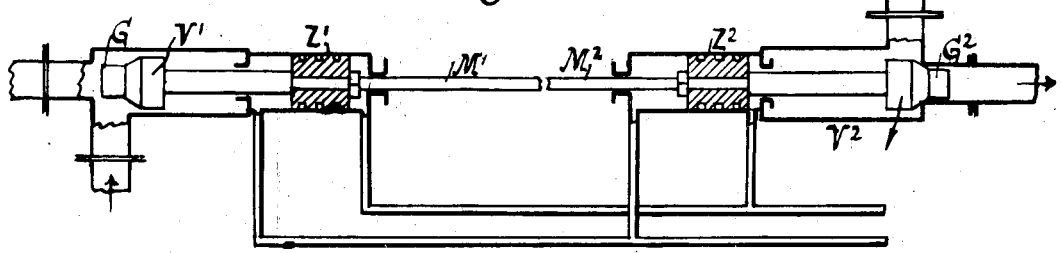

A further security against the simultaneous opening of the valves is afforded by an arrangement as shown in Figure 3. In this arrangement the valves with the respective hydraulic cylinders $Z_1$ and $Z_2$ are provided with piston rods $M_1$ and $M_2$ which pass through the piston heads in the same axis in such a manner that the ends of these piston rods are almost touching when one valve is open and the other closed. Moreover the valve cones are provided with plungers $G_1$ and $G_2$ which serve as piston valves and project into the valve seating and which are somewhat longer than half of the valve stoke. In this manner in the event of the regulator failing to operate it is a pure mechanical impossibility for the two valves even to be partially open simultaneously.

This new arrangement offers the great advantage in contrast to the arrangements already known that it contains very few movable parts which are liable to wear and which are very injurious to the total efficiency. The amount of liquid conveyed with the aid of this apparatus is always smaller by the amount of the volume of the piston rod than the amount of liquid which is released from pressure. A decrease in the amount of absorption liquid in the system is met by counteracting this loss (which amounts to about 5 per cent of the entire quantity of liquid) by means of an ordinary piston pump such as is shown at N, Fig. 1, which pump is connected by pipes Q and Q' with container W and pipe U respectively. The loss occasioned by the frictional resistance of the piston and the loss of pressure in the pipes and valves are extremely small so that the efficiency of such a machine amounts to from 90 to 95 per cent. By employing such a machine, only about from 5 to 10 per cent of the work by pumps otherwise necessary is necessary to bring the liquid to the desired pressure for operation again.

The possibility of employing a membrane instead of a piston is illustrated in Figure 4. The regulation of the valves $V_1$ and $V_2$ in this case is not effected mechanically but electrically by means of two contacts $P_1$ and $P_2$ which are closed or opened by the backward and forward motion of the membrane M. The loss of pressure in the pressure pipes, which in the piston machine is compensated for by reducing the size of the surface of the piston on one side, is made up by a centrifugal pump built in either in front of, or behind, the pressure-releasing machine which pump raises the pressure on the liquid by several atmospheres corresponding to the loss of pressure.

What I claim is:—

1. In a system in which a liquid is passed into and removed from a receptacle kept under increased pressure, in combination a space divided into two compartments by a movable member, the cross-sectional area of which forming part of the said two compartments being different, a valve controlled pipe connecting said receptacle with that compartment of which the larger surface of the said member forms part, for leading a liquid from said receptacle into said compartment, a second valve controlled pipe for leading off the liquid from said compartment, a valve controlled pipe connecting the other compartment of said space to a liquid supply, means for feeding a liquid under slightly increased pressure through said pipe into said compartment, a valve controlled pipe for leading the liquid under increased pressure from said compartment into said receptacle and means for replenishing the liquid under pressure in the system.

2. In a system in which a liquid is passed into and removed from a receptacle kept under increased pressure, in combination a closed cylinder, a piston within said cylinder, a rod on said piston passing tightly through one end wall of said cylinder, a valve controlled pipe connecting said receptacle with that part of said cylinder opposite to that through which the piston rod passes for leading the liquid from said receptacle into said part of the cylinder and a valve controlled pipe for leading off liquid from said part of said cylinder, a valve controlled pipe connecting the other part of said cylinder to a liquid supply, means for feeding a liquid under slightly increased pressure through said pipe into said part of the cylinder, a valve controlled pipe for leading the liquid under pressure into said receptacle and means for replenishing the liquid under pressure in the system.

3. In a system in which a liquid is passed into and removed from a receptacle kept under increased pressure, in combination a closed cylinder, a piston within said cylinder, a rod on said piston passing tightly through one end wall of said cylinder, a tube connected with the interior of that part of said cylinder opposite to that through which the piston rod passes for leading the liquid from said receptacle into said part of the cylinder, a valve controlled pipe connecting said receptacle with said tube, a valve controlled pipe for leading off liquid from said tube, each of said valves in said pipes being provided with a control piston working in a control cylinder, means for supplying liquid from said receptacle alternately to the front side of one of said control pistons and the back side of the other control piston, and to the back side of the first mentioned control piston and the front side of the second mentioned control piston respectively, means for withdrawing liquid in each case from the other sides of said control pistons, a valve controlled pipe connecting the other part of said cylinder to a liquid supply, means for feeding a liquid under slightly increased pressure through said pipe into said part of the cylinder, a valve controlled pipe for leading the liquid under pressure into said receptacle and means for replenishing the liquid under pressure in the system.

In testimony whereof I have hereunto set my hand.

ALBERT BERENBRUCH.